(12) United States Patent
Rosemeier et al.

(10) Patent No.: US 8,182,386 B2
(45) Date of Patent: May 22, 2012

(54) TRANSMISSION DEVICE COMPRISING AT LEAST TWO OUTPUT SHAFTS

(75) Inventors: Thomas Rosemeier, Meckenbeuren (DE); Bernd-Robert Hohn, Munich (DE); Christoph Pelchen, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 152 days.

(21) Appl. No.: 12/808,520

(22) PCT Filed: Dec. 8, 2008

(86) PCT No.: PCT/EP2008/066980
§ 371 (c)(1),
(2), (4) Date: Jun. 16, 2010

(87) PCT Pub. No.: WO2009/080475
PCT Pub. Date: Jul. 2, 2009

(65) Prior Publication Data
US 2011/0039650 A1    Feb. 17, 2011

(30) Foreign Application Priority Data
Dec. 20, 2007   (DE) .......................... 10 2007 055 883

(51) Int. Cl.
*F16H 48/30* (2012.01)
*F16H 48/06* (2006.01)
(52) U.S. Cl. ...................................... 475/150; 475/221
(58) Field of Classification Search .................... 475/28, 475/150, 151, 221, 332
See application file for complete search history.

(56) References Cited

U.S. PATENT DOCUMENTS

| | | | | |
|---|---|---|---|---|
| 3,383,953 | A | * | 5/1968 | Christenson ..................... 475/23 |
| 3,392,602 | A | * | 7/1968 | Frost ............................... 475/19 |
| 5,437,583 | A |  | 8/1995 | Shibahata et al. |
| 6,098,737 | A |  | 8/2000 | Aoki |
| 6,796,412 | B2 | * | 9/2004 | Teraoka ........................... 192/35 |
| 7,156,766 | B2 |  | 1/2007 | Gassmann |
| 7,491,146 | B2 |  | 2/2009 | Sharma et al. |
| 7,651,426 | B2 |  | 1/2010 | Yokoyama et al. |
| 2007/0249456 | A1 |  | 10/2007 | Meixner |

FOREIGN PATENT DOCUMENTS

| | | |
|---|---|---|
| DE | 44 08 587 A1 | 10/1994 |
| DE | 103 29 770 A1 | 2/2005 |
| DE | 10 2005 021 023 A1 | 11/2006 |
| DE | 10 2006 022 175 A1 | 11/2007 |
| DE | 10 2006 031 089 A1 | 1/2008 |
| EP | 0 224 144 A1 | 6/1987 |
| EP | 1 787 846 A1 | 5/2007 |
| WO | 2005/110790 A2 | 11/2005 |
| WO | 2007/002743 A2 | 1/2007 |

* cited by examiner

Primary Examiner — Edwin A Young
(74) Attorney, Agent, or Firm — Davis & Bujold, P.L.L.C.

(57) ABSTRACT

A transmission device with at least two output shafts and at least two multi-shaft planetary gearsets that are actively connected with one another. A shaft of a planetary gearset can be actively connected with an output shaft. In addition, a shifting mechanism, located between the two output shafts, shifts between a first power path or a second power path. In one of the planetary gearsets, torque from an electric machine can be transmitted along either the first or the second power path. In the first power path, torque from the electric machine is transmitted to the two output shafts in equal parts and with the same sign. In the second power path, torque is transmitted to the two output shafts in equal parts but with opposite signs. The planetary gearset, in the area of which the torque from the electric machine can be transmitted, is a simple negative planetary gearset.

15 Claims, 7 Drawing Sheets

TRANSMISSION DEVICE COMPRISING AT LEAST TWO OUTPUT SHAFTS

This application is a National Stage completion of PCT/EP2008/066980 filed Dec. 8, 2008, which claims priority from German patent application serial no. 10 2007 055 883.1 filed Dec. 20, 2007.

FIELD OF THE INVENTION

The invention concerns a transmission device with at least two output shafts and with at least two multi-shaft planetary gearsets in active connection with one another.

BACKGROUND OF THE INVENTION

A drive device for motor vehicles, for driving a vehicle axle of a motor vehicle with two wheels in active connection with one another via two planetary gearsets is known from DE 10 2006 031 089.6. The first planetary gearset is designed as a so-termed stepped planetary gearset with stepped planetaries, whereas the second planetary gearset is a so-termed positive planetary gearset with shiftable reversing stages. In each case a shaft of a planetary gearset can be brought into active connection with a driveshaft that is connected to a wheel or with an output shaft of the drive device. Moreover a shifting mechanism is provided, by means of which a first power path or a second power path between the wheels of the vehicle axle can be engaged.

In the area of a further shaft of the planetary gearsets torque of an electric machine can be passed into the first or the second power path. The torque of the electric machine can be transferred in equal parts and with the same sign to the output shafts or wheels of the vehicle axle when the first power path is engaged, and in equal parts but with opposite signs when the second power path is engaged, in order, during a first operating mode, to provide drive torque in the area of the vehicle axle, or during a second operating mode, to improve the driving behavior of a motor vehicle by distributing the torque produced by the electric machine in equal parts but with opposite signs between the wheels of the vehicle axle and transmit them thereto.

The design of the drive device with a stepped planetary gearset is elaborate and characterized by high production costs, which, is undesirable.

SUMMARY OF THE INVENTION

Accordingly, the purpose of the present invention is to make available a transmission device with at least two output shafts, and at least two multi-shaft planetary gearsets in active connection with one another, with which both of the operating modes described above can be produced and which has a structure of simple design that can be made inexpensively.

The transmission device according to the invention is made with at least two output shafts and with at least two multi-shaft planetary gearsets in active connection with one another. In each case a shaft of a planetary gearset can be brought into active connection with an output shaft of the transmission device. In addition, a shifting device is provided, by means of which a shift can be carried out between a first power path and a second power path between the output shafts of the transmission device, and with a further shaft of one of the planetary gearsets torque of an electric machine can be passed into the first or the second power path. The torque of the electric machine is passed in equal parts and with the same sign to the output shafts when the first power path is engaged and the transmission device is in its drive mode, and in equal parts but with opposite signs when the second power path is engaged and the transmission device is in a torque-vectoring operating mode. The planetary gearset with which the torque of the electric machine can be transferred is designed as a simple negative planetary gearset.

With the transmission device according to the invention, besides the electric drive mode, a torque-vectoring operating mode can be implemented in the area of a vehicle axle, whereby, compared with the drive device known from the prior art, by virtue of the negative planetary gearset, the proposed transmission device has a more simply designed structure which is less costly to produce. Moreover the two operating modes, i.e. the drive mode and the torque-vectoring operating mode, can be implemented with only a single electric machine so that besides a compact structure, the transmission device is also characterized by low overall weight and can be operated with high efficiency over its full operating range.

In this case, the term negative planetary gearset or negative transmission is understood to mean a planetary transmission with a negative fixed transmission ratio. On the other hand, a positive planetary gearset or positive transmission is a planetary transmission with a positive fixed transmission ratio, the fixed transmission ratio being the ratio between the angular speeds or rotation speeds of the central wheel shafts in a planetary transmission when the carrier is stationary or is assumed to be stationary.

BRIEF DESCRIPTION OF THE DRAWINGS

Further advantages and advantageous developments of the invention emerge from the claims and from the example embodiments whose principle is described with reference to the drawing; for the sake of clarity, in the description of the example embodiments the same indexes are used to denote components having the same structure and function:

DETAILED DESCRIPTION OF THE PREFERRED EMBODIMENTS

Figure 1:
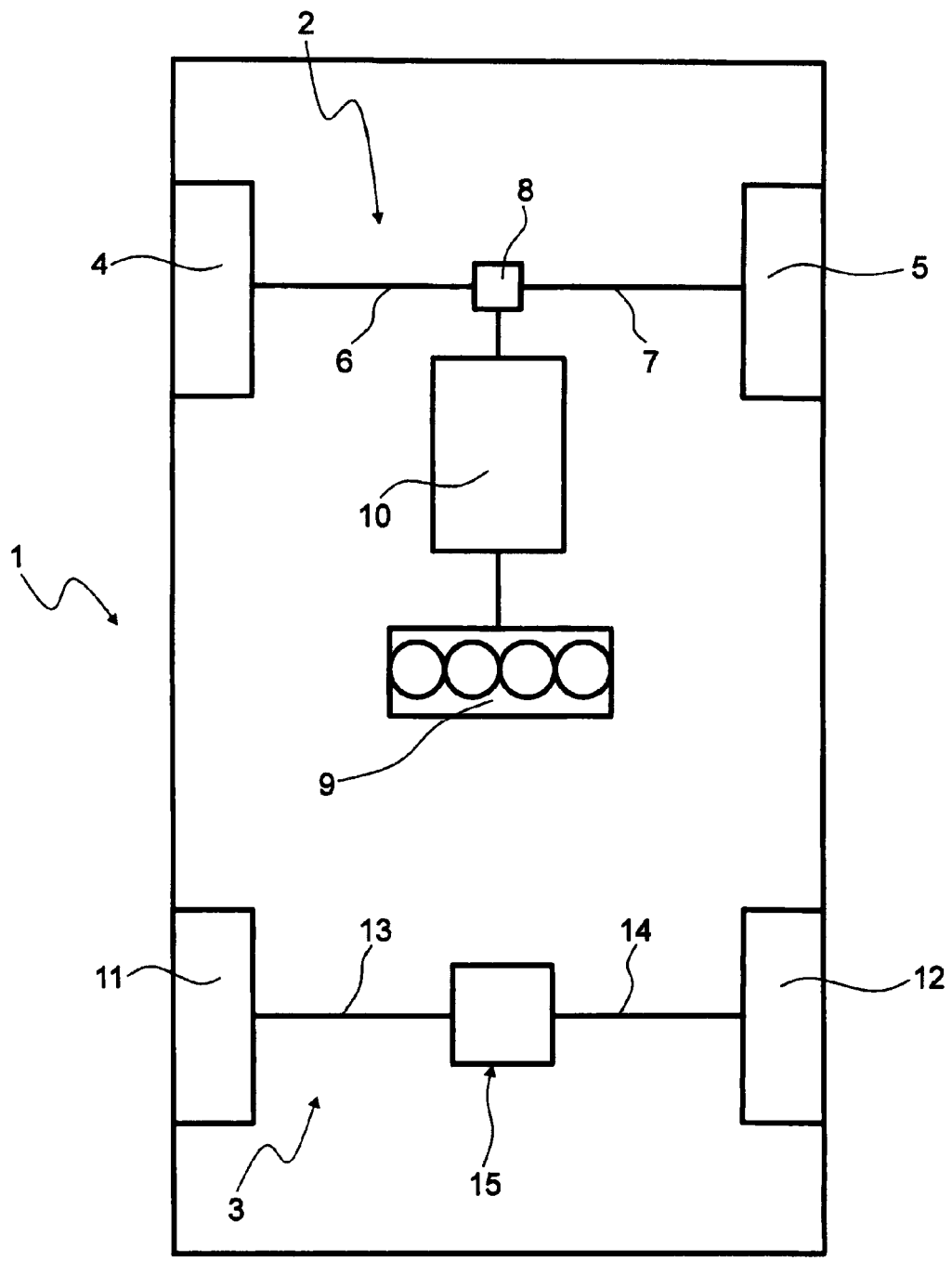
FIG. 1: Very schematic representation of a vehicle constructed with the transmission device according to the invention in the area of a rear vehicle axle

FIG. 1 shows a very schematic representation of a vehicle 1 with a first vehicle axle 2 and a second vehicle axle 3, the first vehicle axle 2 is a front vehicle axle and the second vehicle axle 3 is a rear vehicle axle of the vehicle 1. The first vehicle axle 2 has two drive wheels 4, 5 which are connected by two driveshafts 6, 7 to a differential transmission unit 8. By means of the differential transmission unit 8, drive torque produced by a drive unit 9 in this case in the form of an internal combustion engine is distributed in equal parts to the two drive wheels 4 and 5. In addition, between the drive unit 9 and the differential transmission unit 8, a transmission device 10 is provided, which can be made as a manual shift transmission, an automatic transmission or an automated transmission and by means of which, in a manner known per se, various continuously adjustable transmission ratios or transmission ratio steps can be produced.

The second vehicle axle 3 also has two drive wheels 11, 12, which are in active connection with one another via two driveshafts 13, 14 and a transmission device 15, in order to provide the second vehicle axle 3 a torque in the area of the drive wheels 11, 12 during a drive mode, or, during a torque-vectoring operating mode, in order to be able to influence the driving behavior in a positive manner. With the transmission device 15 deactivated the vehicle 1 according to FIG. 1 is front-wheel-driven, whereas when the transmission device 15 is in the drive mode the vehicle 1 is powered in the area of both vehicle axles and thus corresponds to a four-wheel-drive vehicle. If the drive unit 9 is deactivated, i.e. the internal combustion engine is static, the activated transmission device 15 can power the vehicle. If for example the drive motor of the transmission device is an electric motor, the vehicle can be driven under electric power (hybrid drive). The prerequisite for this is an appropriately designed energy store. In the torque-vectoring operating mode of the transmission device 15 the vehicle 1 is powered in the area of the front vehicle axle and the driving behavior is influenced by means of an "active" rear vehicle axle.

Figure 2:
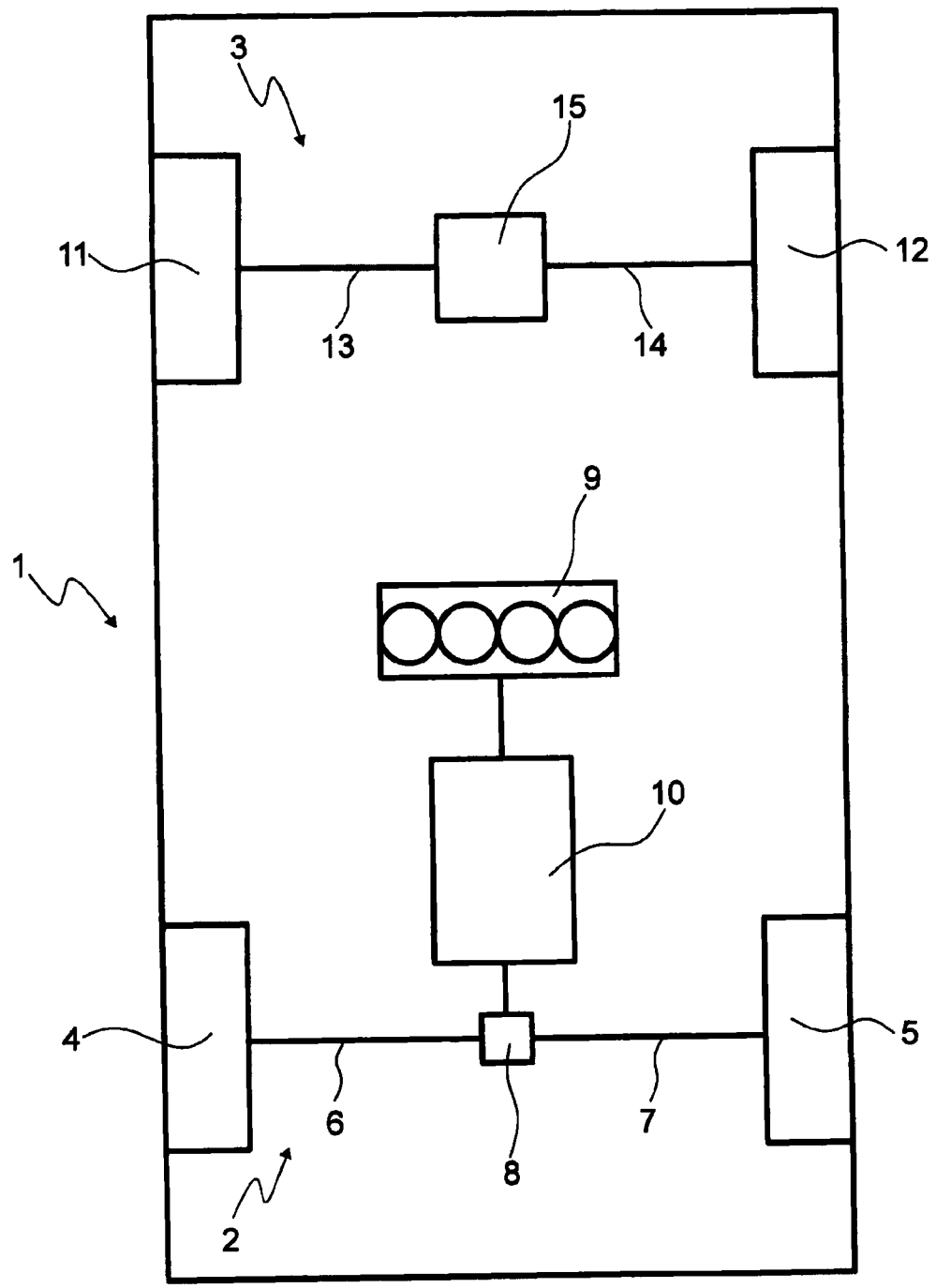
FIG. 2: Representation of a vehicle corresponding to FIG. 1, constructed with the transmission device according to the invention in the area of a front vehicle axle

In the second example embodiment of the motor vehicle 1 shown in FIG. 2, the first vehicle axle 2 is the rear axle and the second vehicle axle 3 is the front axle of the motor vehicle 1, so when the transmission device 15 is inactive the vehicle is a purely rear-wheel-drive vehicle. In the drive mode of the transmission device 15, the vehicle 1 of FIG. 2, like the vehicle in FIG. 1, is powered in the area of both vehicle axles 2 and 3 (all-wheel drive) or, when the internal combustion engine is static, it is powered by the second vehicle axle 3 alone (hybrid drive). In the torque-vectoring operating mode of the transmission device 15, the driving behavior of the vehicle 1 is influenced not only by the rear-wheel drive but also by the "active" front axle of the vehicle.

FIGS. 3 to 7 show a number of gear layouts of various example embodiments 15 according to FIGS. 1 and 2, which have a common basic structure for producing the drive mode and the torque-vectoring operating mode.

Figure 3:
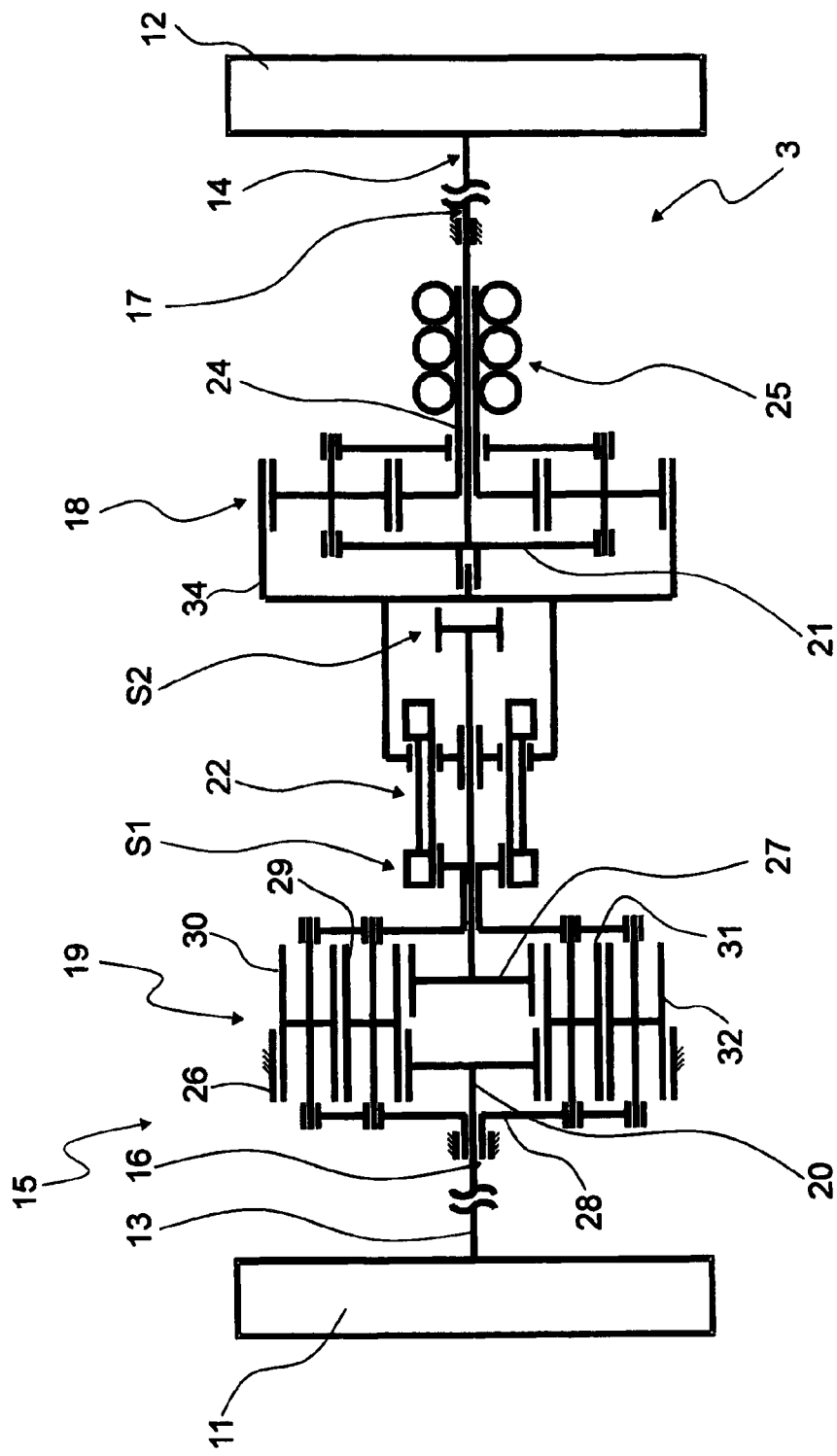
FIG. 3: Gear layout of a first example embodiment of the transmission device according to FIGS. 1 and 2
Figure 4:
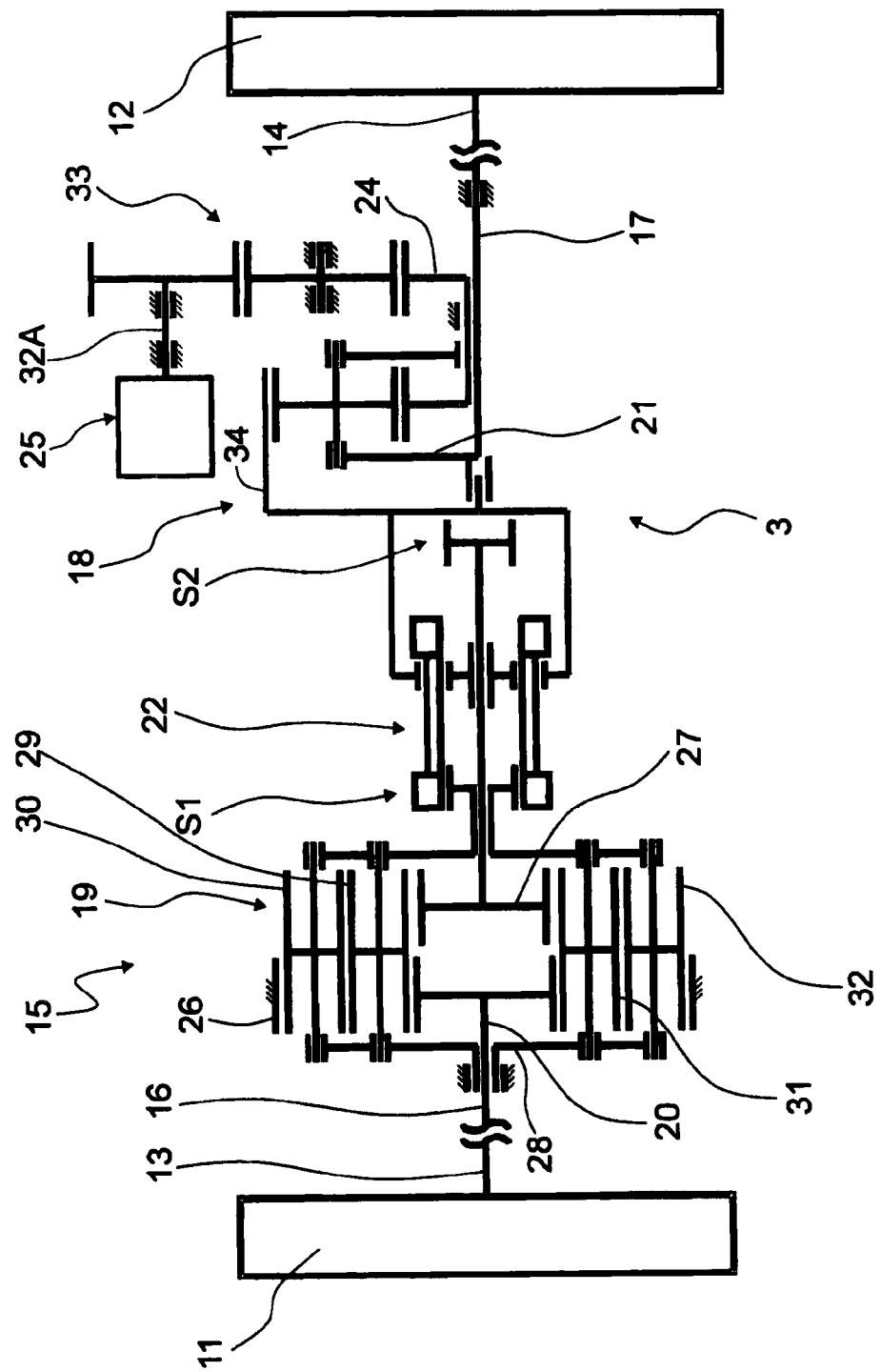
FIG. 4: Gear layout of a second example embodiment of the transmission device according to FIGS. 1 and 2
Figure 5:
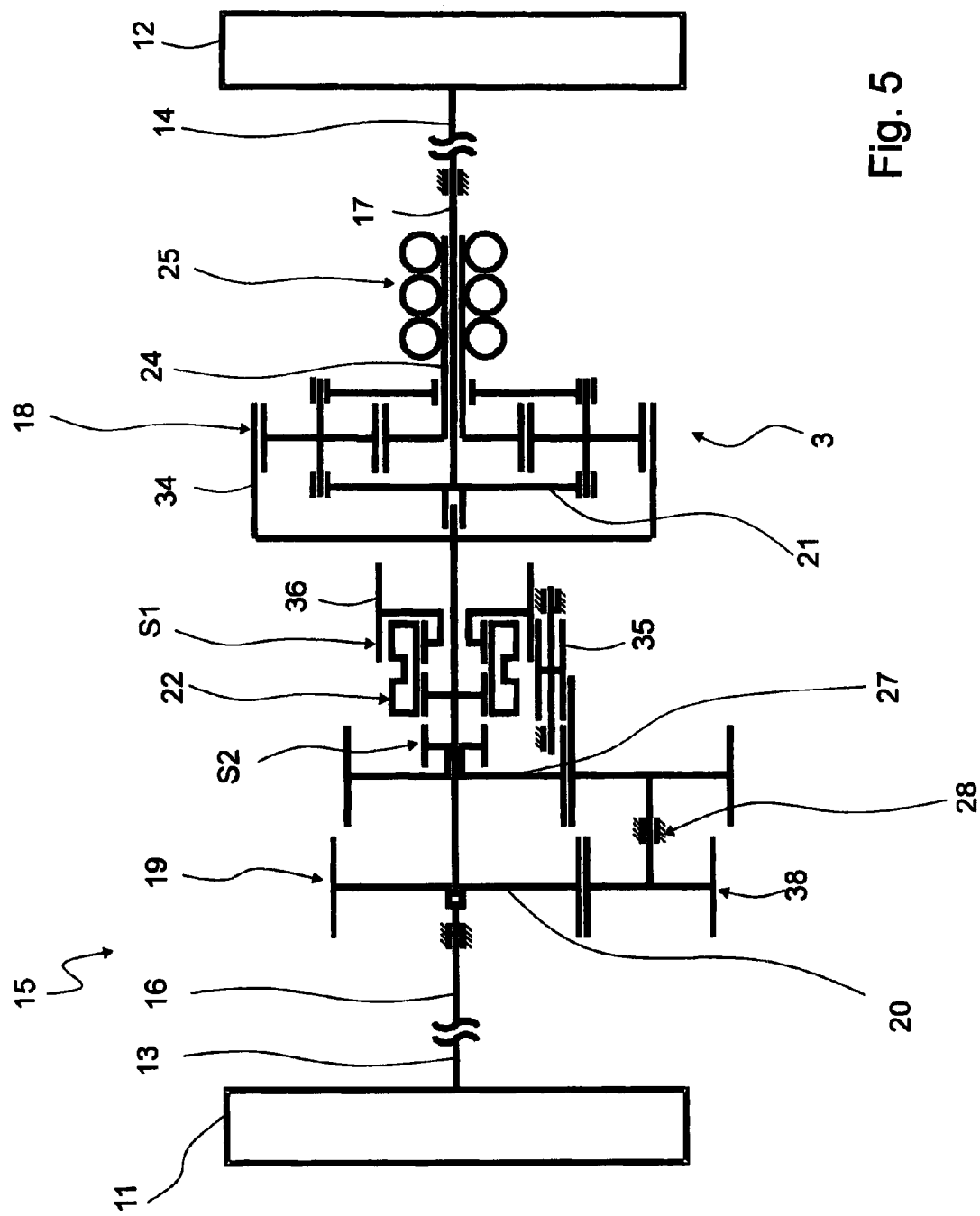
FIG. 5: A third embodiment of the transmission device according to FIGS. 1 and 2 with a positive planetary gearset

Thus, the transmission devices 15 in FIGS. 3 to 5 are in each case formed with two output shafts 16, 17 and with two multi-shaft planetary gearsets 18, 19 in active connection with one another. In the example embodiments of the transmission device 15 shown in FIGS. 3 to 6, in each case a shaft 20 of a second planetary gearset 19 or a shaft 21 of a first planetary gearset 18 is connected to the output shaft 16 or to the output shaft 17.

In addition, in the example embodiments of the transmission device 15 shown in FIGS. 3 to 6, a shifting mechanism 22 is arranged between the two secondary gearsets 18 and 19, which can be switched between two different operating conditions or shift positions S1 and S2, and which connects the two output shafts 16 and 17 of the transmission device 15 to one another via a first power path or a second power path of the transmission 15. In contrast, in the transmission device 15 shown in FIG. 6 the shaft 34 (ring gear) is connected to the output shaft 17.

Figure 7:
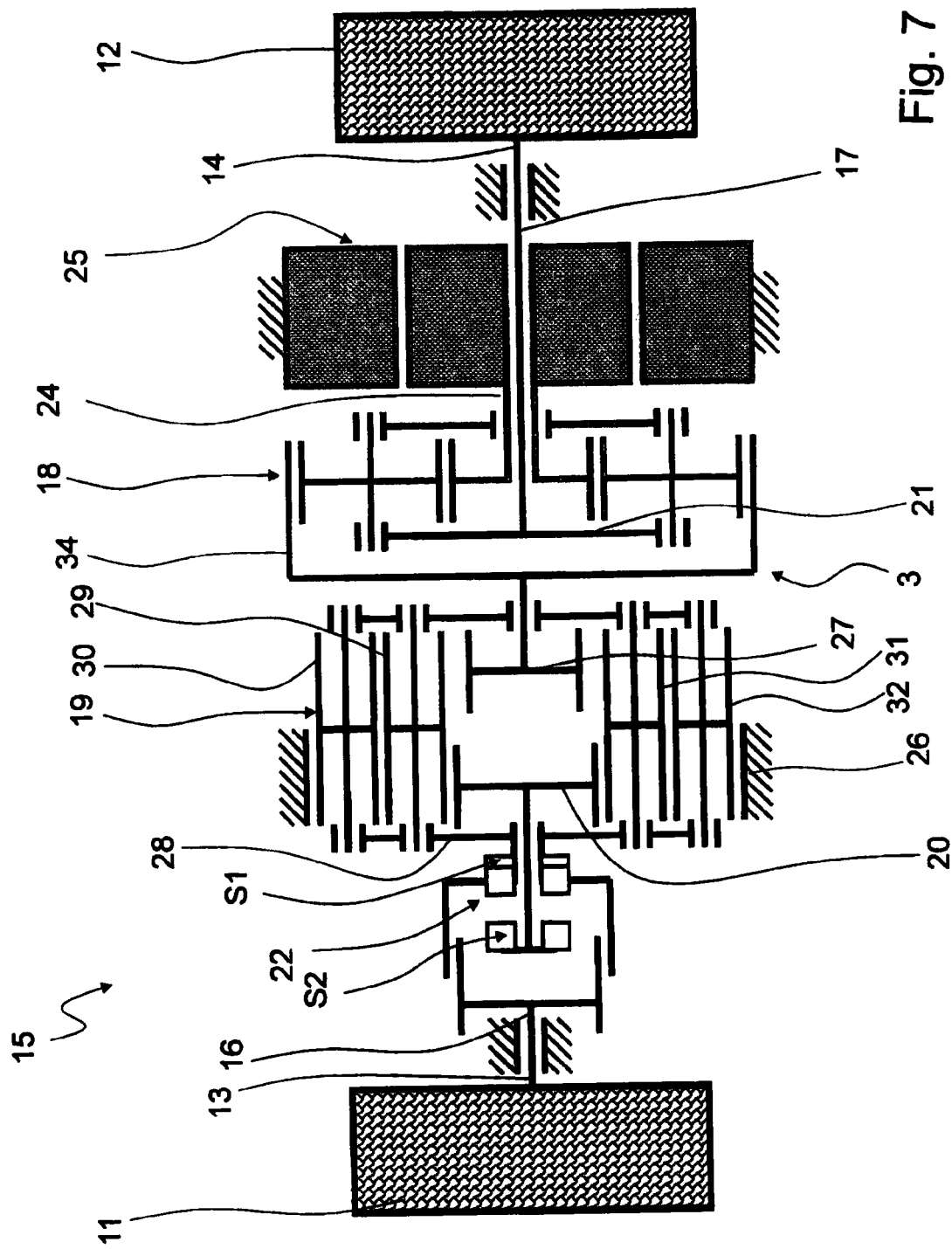
FIG. 7: A fifth example embodiment of the transmission device according to FIGS. 1 and 2, with a shifting mechanism arranged between a planetary gearset and an output shaft

In the transmission device 15 shown in FIG. 7 the shifting mechanism 22 is arranged between the second planetary gearset 19 and the drive wheel 11 of the second vehicle axle 3, so that in the second shift position S2 the output shaft 16 of the transmission device 15 is actively connected to the shaft 20 of the second planetary gearset 19 and in the first shift position S1 of the shifting mechanism 22 it is actively connected to a further shaft 28 of the planetary gearset 19.

Furthermore, in all the example embodiments of the transmission device 15 shown in the drawing, in the area of a further shaft 24 of the first planetary gearset 18 torque of an electric machine 25 can be transferred into the first or the second power path of the transmission device 15, in such manner that when the first power path is engaged the torque of the electric machine 25 is distributed between the output shafts 16, 17 and transferred to them in equal parts and with the same sign, and when the second power path is engaged the torque is distributed between and transferred to the output shafts 16, 17 in equal parts with opposite signs.

Moreover, in all the example embodiments of the transmission device 15 shown in the drawings the first planetary gearset 18 is designed as a simple negative planetary gearset, whereas the second planetary gearset 19 in the example embodiments of the transmission device 15 shown in FIGS. 3, 4 and 7 is made as a double planetary gearset. In the example embodiments of the transmission device 15 shown in FIGS. 5 and 6 the second planetary gearset is designed as a positive planetary gearset.

Basically, all the embodiments of the transmission device 15 shown in the drawings are operated in the drive mode in the first shift position S1 of the shifting mechanism 22, such that the drive wheels 4, 5 of the first vehicle axle 2 are supplied or acted upon by torque from the drive unit 9 and the drive wheels 11, 12 of the second vehicle axle 3 by torque from the electric machine 25. The vehicle 1 can be operated in both traction and thrust operation. In particular, during thrust operation of the vehicle braking energy can be recuperated while the electric machine 25 is being operated as a generator.

If the shifting mechanism 22 is switched to its second shift position S2, the transmission device 15 transfers torque provided by the electric machine 25 to the drive wheels 11 and 12 in equal parts but with opposite signs, and thereby accelerates one of the drive wheels 11 or 12 while the other drive wheel 12 or 11 is braked to the same extent. Thus, in the area of the second vehicle axle 3 so-termed torque-vectoring is carried out in order, in a manner known per se, to improve the driving stability of the vehicle 1 and achieve more agile behavior of the vehicle 1 while driving round a curve.

In the example embodiment of the transmission device 15 shown in FIG. 3, the further shaft 24 of the first planetary gearset 18, made as a sun gear, is connected to the electric machine 25 and the drive output of the first planetary gearset 18 takes place via the shaft 21 in the form of a carrier in the direction toward the drive wheel 12. According to FIG. 3, the second planetary gearset 19 of the transmission device 15, made as a double planetary gearset, comprises in addition to a rotationally fixed ring gear 26 the shaft 20 made as a sun gear and a second sun gear 27, such that the two sun gears 20 and 27 are formed with different numbers of teeth.

Between the ring gear 26 and the two sun gears 20 and 27, in the carrier 28 a plurality of planetary gearsets, each with two planetary gearwheels 29, 30 and 31, 32 are provided, such that in each case the first planetary gear 29 or 31 meshes with the two sun gears 20 and 27 and the second planetary gear 30 or 32 meshes with the first planetary gear 29 or 31 and the ring gear 26.

Depending on the respective shift position S1 or S2 of the shifting mechanism 22, the ring gear 34 of the first planetary gearset 18 is connected optionally to the carrier 28 or to the second sun gear 27, the latter having the smaller number of teeth, so that the drive output to the drive wheel 11 takes places via the first sun gear 20.

Thanks to the design of the second planetary gearset 19 described above, the embodiment of the transmission device 15 shown in FIG. 3 has a very compact structure with only two tooth engagements arranged next to one another in the axial direction. Furthermore, a positive transmission ratio can be produced from the first sun gear 20 to the second sun gear 27. Moreover, a transmission ratio of the same size but opposite sign can be produced from the first sun gear 20 to the carrier 28.

In the first shift position S1 of the shifting device 21, the drive torque of the electric machine 25, correspondingly geared, is passed to the output shaft 16, and in this case the torque to be supported in the area of a component fixed on the housing or on the vehicle body is taken up on the transmission side by the ring gear 26 of the second planetary gearset 19. In this way the ring gear torque, which is of the same order of magnitude as the drive torque of the electric machine 25, is applied in a structurally very favorable manner with comparatively low gearing forces.

In the second shift position S2 of the shifting mechanism 22, i.e. in the so-termed torque-vectoring operating mode of the transmission device 15, torque that corresponds essentially to the drive torque of the electric machine 25 is supported in the area of the ring gear 26 of the second planetary gearset 19. The major part of the power passing through the second power path is transferred via the inner planetary gearwheels 29 and 31 between the two sun gears 20 and 27. Since the power transfer is then taking place essentially by virtue of two tooth engagements, the gearing efficiency of the coupling transmission or second planetary gearset 19 is correspondingly high.

During a switch-over between the first shift position S1 and the second shift position S2 of the shifting mechanism 22, owing to a rotation direction reversal only the ring gear 34 of the first planetary gearset 18 has to by synchronized by the electric machine 25. For that reason the reaction torque to be supported at the drive wheel 12 is correspondingly low.

Basically, the gearing efficiency of the second planetary gearset 19 in the first shift position S1 of the shifting mechanism 22 is not as high as the gearing efficiency of the concept of the transmission device 15 according to FIG. 7, and amounts to approximately 93%. However, the overall efficiency of the transmission device, accordingly to FIG. 3 is better than 93% since only about half the drive power of the electric machine 25 is transferred via the second planetary gearset 19.

The second example embodiment of the transmission device 15 shown in FIG. 4 corresponds essentially to the transmission device 15 according to FIG. 3, so regarding its function, reference can be made to the description of FIG. 1 and only the essential differences between these two example embodiments will be described below.

In the version of the transmission device 15 in FIG. 3 the electric machine 25 is arranged, in a space-saving manner, coaxially with the sun gear 24 of the first planetary gearset 18 made as a hollow shaft and the output shaft 17 passing through the sun gear 24, whereas in the version of the transmission device 15 according to FIG. 4 the electric machine 25 is in this case arranged axis-parallel to the output shaft 17 and radially outside the first and second planetary gearsets 18, 19. A motor output shaft 32A of the electric machine 25 is arranged axis-parallel to the driveshaft 14 and to the output shaft 17, and between the sun gear 24 of the first planetary gearset 18 and the motor output shaft 32A of the electric machine 25 in this case a spur gear stage 33 is provided, to pass the torque from the electric machine 25 into the first or the second power path of the transmission device 15 via the sun gear 24. Alternatively, instead of the spur gear stage 33 a chain or belt drive could be provided between the motor output shaft 32A and the sun gear 24.

Regardless of the design form of the transfer or connection between the motor output shaft 32A and the sun gear 24, the additional transmission ratio in this area offers the possibility of being able to implement the drive mode or the torque-vectoring operating mode of the transmission device 15 with an electric machine that delivers a lower torque compared with the version of the transmission device 15 shown in FIG. 3.

Thus, depending on the particular vehicle concept concerned, the planetary gearsets 18 and 19 of the transmission device 15 according to FIG. 4 can be combined with various electric machines having different torque capacities. Moreover, structural space available outside the area of the output shaft 17 and the driveshaft 14 can be used for the arrangement of an electric machine, whereas this space may not be available in the area of the output shaft 17 and the driveshaft 14 of the second vehicle axle 3.

Compared with the transmission device 15 according to FIG. 3, the transmission device 15 of FIG. 4 has lower overall efficiency since the electric power or the torque produced by the electric machine 25 is passed into the first or second power path via two additional tooth engagements of the spur gear stage 33 or the additional chain or belt drive.

In the example embodiment of the transmission device 15 shown in FIG. 5, the second planetary gearset is made as a positive planetary gearset with two sun gears 20 and 27 which have different respective numbers of teeth and which mesh with stepped planetary gears 38. To reverse the torque, in this example embodiment, an additional planetary gear 35 with a further sun gear 36 is provided, which is in active connection with the carrier 21 of the first planetary gearset 18 when the shifting mechanism 2 is in its first shift position S1.

The design of the second planetary gearset 19 in FIG. 5 has a gearing efficiency of about 97% in the first shift position S1 of the shifting mechanism 22 and is higher than the gearing efficiency of the two example embodiments according to FIGS. 3 and 4. Moreover, the second planetary gearset 19 of the transmission device 15 in FIG. 5 is also characterized by needing more structural space, since compared with the structures of the two second planetary gearsets 19 in FIGS. 3 and 4 respectively, the second planetary gearset 19 in FIG. 5 is formed with three tooth engagements next to one another in the axial direction.

The torque to be supported in the first shift position S1 of the shifting mechanism 22 by the housing of the transmission device 15 is transferred into the housing of the transmission device 15 via the mounting of the stepped planetary gear 38 of the second planetary gearset 19. However, this entails greater design and construction effort than in the example embodiments of the transmission device 15 according to FIGS. 3, 4 and 7. On the other hand, the number of components of the second planetary gearset 19 according to FIG. 5 is larger than in the second planetary gearset 19 according to FIGS. 3, 4 and 7.

Figure 6:
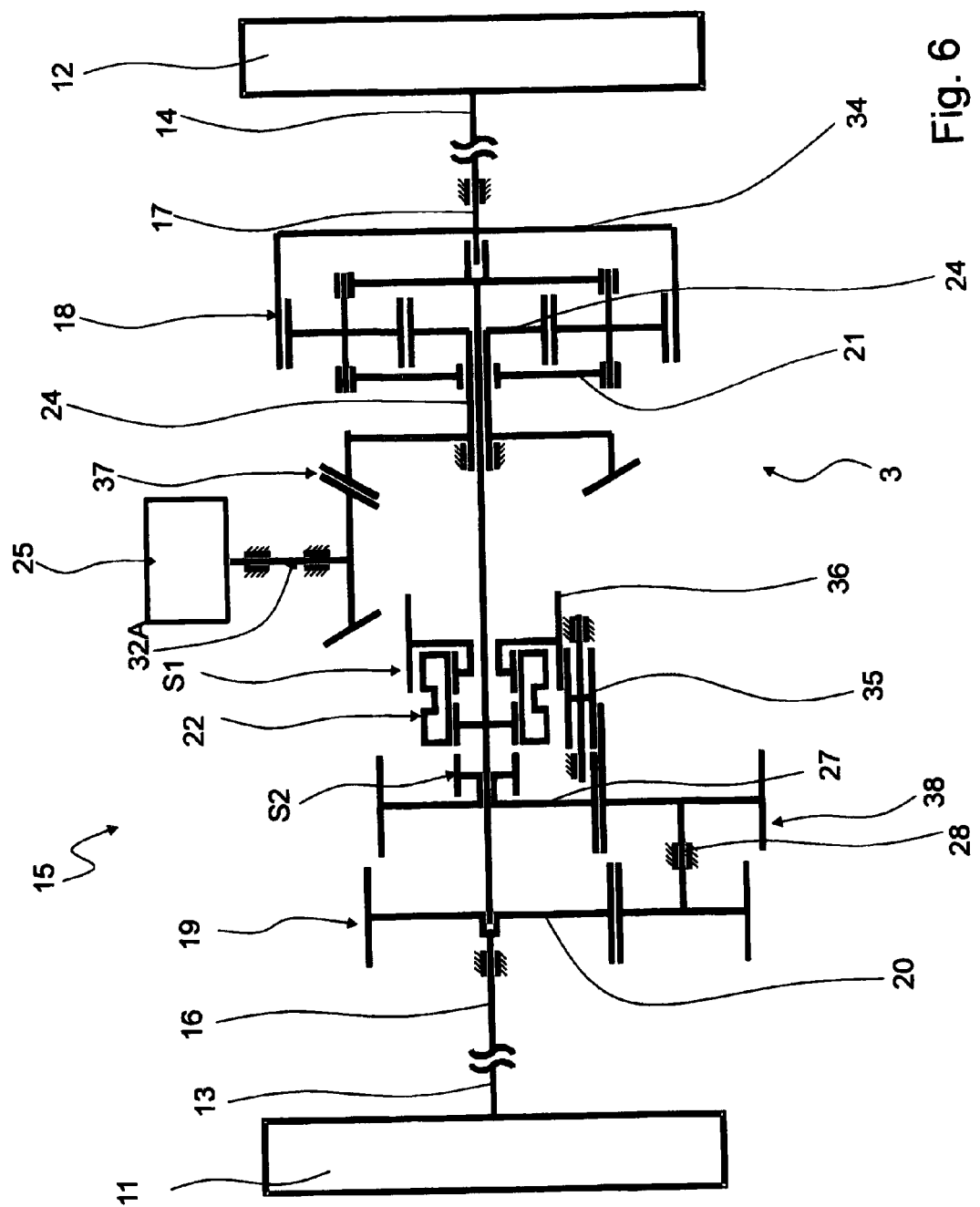
FIG. 6: A fourth example embodiment of the transmission device according to FIGS. 1 and 2.

The fourth example embodiment of the transmission device 15 shown in FIG. 6 is essentially a further development of the third example embodiment of the transmission device 15 shown in FIG. 5, in which, compared with the design of the transmission device 15 in FIG. 5, the first planetary gearset 18 according to FIG. 6 is in a mirror image relationship. That is to say, the ring gear 34 of the first planetary gearset 18 is connected to the output shaft 17 of the transmission device 15 and the carrier 21 of the first planetary gearset 18 is interconnected with the second planetary gearset 19. In addition, the sun gear 24 of the first planetary gearset 18 is in active connection via a bevel gear stage 37 with the electric machine 25 or its motor output shaft 32A, so that the electric machine or its motor output shaft 32A can be arranged perpendicularly to the output shaft 17 or rotated by 90° relative to the wheel axle.

Depending on the application concerned, in some circumstances this enables an arrangement of the electric machine which is more favorable in terms of structural space, namely at a 90° angle to the front or rear axle of the vehicle in the area of the axial center of the transmission device 15, although the additional bevel gear stage 37 reduces the overall efficiency of the transmission device 15 according to FIG. 6 compared with the embodiments of the transmission device 15 described earlier. Furthermore, as a result of the transmission ratios the torque in the area of the shifting mechanism 22 is higher than the torque applied in the area of the drive wheels 11 and 12.

In the example embodiment of the transmission device 15 shown in FIG. 7, in both the first shift position S1 and the second shift position S2 of the shifting mechanism 22, in the area of the second planetary gearset 19 and by virtue of a different transmission ratio and a lesser rolling power flow, higher efficiency can be achieved compared with the example embodiments of the transmission device 15 according to FIGS. 3 and 4, and this results in a higher overall transmission efficiency of the transmission device 15 according to FIG. 7.

Moreover, compared with the transmission devices according to FIGS. 3 and 4 the transmission device of FIG. 7 is designed more favorably with regard to structural space, since the shifting mechanism 22 is not positioned between the two planetary gearsets 18 and 19 and can be made more compact on the wheel side.

Besides lower bearing rotational speeds in the area of the planetary gearwheels 29 to 32, the rotational speed of the carrier 28 of the second planetary gearset 19 is also around 33% lower than in the transmission devices 15 according to FIGS. 3 and 4. In a simple manner the result of this is that on the one hand swashing losses in the transmission device 15 are reduced and on the other hand the centrifugal force in the area of the planetary gears 29 to 32 at high rotation speeds is substantially lower.

In contrast, when a shift is carried out between the two shift positions S1 and S2 of the shifting mechanism 22, not only the ring gear 34 of the first planetary gearset 18 but other components of the second planetary gearset 19 as well have to be synchronized. Because of this, for an equal synchronization duration a higher moment of inertia has to be supported in the area of a drive wheel 11 or 12 compared with the transmission devices 15 according to FIGS. 3 and 4.

With the transmission device according to the invention, the drive mode and also the torque-vectoring operation mode can be implemented with a single system that occupies little structural space, has low overall weight and can be produced inexpensively.

For this purpose an electric machine is connected to a shaft of a simple planetary gearset, which is not the summation shaft of the planetary transmission set, which assumes the differential function of the transmission device according to the invention in the area of a vehicle axle. A second shaft of the simple planetary gearset or negative planetary gearset is connected to a drive wheel of the vehicle axle in the area of which the transmission device is arranged. Between the third shaft of the negative planetary gearset and the other drive wheel of the vehicle axle is interposed a second planetary gearset, which on the one hand compensates the unequal torque distribution of the first simple negative planetary gearset and, in a second shift position of the shifting mechanism, also reverses the sign of the torque delivered to one drive wheel in order to enable the torque-vectoring operating mode.

Basically, the transmission device according to the invention is characterized by multi-functionality with only one electric motor. In this, in the various operating modes of the transmission device according to the invention with its compact structure and low inherent weight, appropriate transmission ratios can in each case be provided. Furthermore, the transmission device can be produced inexpensively and can be operated with high efficiency at any operating point.

Indexes
1 Vehicle
2 First vehicle axle
3 Second vehicle axle
4, 5 Drive wheel
6, 7 Driveshaft
8 Differential transmission device
9 Drive unit
10 Transmission device
11, 12 Drive wheel
13, 14 Driveshaft
15 Transmission device
16, 17 Output shaft
18 First planetary gearset
19 Second planetary gearset
20 Shaft of the second planetary gearset
21 Shaft of the first planetary gearset
22 Shifting mechanism
24 Further shaft of the first planetary gearset
25 Electric machine
26 Ring gear of the second planetary gearset
27 Second sun gear of the second planetary gearset
28 Carrier of the second planetary gearset
29 to 32 Planetary gearwheels
32A Motor output shaft for the electric machine
33 Spur gear stage
34 Ring gear of the first planetary gearset
35 Additional planetary gearwheel
36 Further sun gear
37 Bevel gear stage
38 Stepped planetary gear
S1 First shift position of the shifting mechanism
S2 Second shift position of the shifting mechanism

The invention claimed is:
1. A transmission device (15) comprising:
at least first and second output shafts (16, 17) and at least first and second multi-shaft planetary gearsets (18, 19) being actively connected with one another, a shaft (20, 21) of each of the first and the second planetary gearsets (18, 19) being actively connectable with a respective one of the first and second output shafts (16, 17); and
a shifting mechanism (22), provided between the first and the second output shafts (16, 17), for shifting between one of a first power path and a second power path such that, in an area of a further shaft (24) of one of the first and the second planetary gearsets (18, 19), torque from an electric machine (25) being transmittable along one of the first and the second power paths in such manner that, when the first power path is engaged, the torque from the electric machine (25) being transmitted in equal amounts and with the same sign to the first and the second output shafts (16, 17), and when the second power path is engaged, the torque from the electric machine (25) is transmitted in equal amounts but with opposite signs;

wherein the first planetary gearset (18), in an area of which the torque from the electric machine (25) is transmittable, is a simple negative planetary gearset.

2. The transmission device according to claim 1, wherein a carrier (21) of the negative planetary gearset (18) is connected to the second output shaft (17).

3. The transmission device according to claim 2, wherein a sun gear (24) of the negative planetary gearset (18) is a hollow shaft through which a connection between the carrier (21) and the second output shaft (17) passes.

4. The transmission device according to claim 1, wherein a ring gear (34) of the negative planetary gearset (18) is actively connectable, via the shifting mechanism (22), with one of a first shaft (28) and a second shaft (27) of the second planetary gearset (19).

5. The transmission device according to claim 1, wherein a carrier (21) of the negative planetary gearset (18) is actively connectable, via the shifting mechanism (22), with one of a first shaft (36) and a second shaft (27) of the second planetary gearset (19).

6. The transmission device according to claim 5, wherein the first shaft of the second planetary gearset (19) is a sun gear (27) and the second shaft of the second planetary gearset (19) is a sun gear (20).

7. The transmission device according to claim 1, wherein the secondary planetary gearset (19) is a double planetary gearset.

8. The transmission device according to claim 7, wherein a ring gear of the double planetary gearset is rotationally fixed.

9. The transmission device according to claim 1, wherein the second planetary gearset (19) is a positive planetary gearset.

10. The transmission device according to claim 1, wherein a ring gear (34) of the negative planetary gearset (18) is connected to the second output shaft (17).

11. The transmission device according to claim 1, wherein the shifting mechanism (22) is arranged between the first and the second planetary gearsets (18, 19).

12. The transmission device according to claim 1, wherein the shifting mechanism (22) is arranged between
one of the first and the second planetary gearsets (18, 19), and
one of the first and the second output shafts (16, 17).

13. The transmission device according to claim 12, wherein one of a sun gear (20) of the second planetary gearset (19) and a carrier (28) of the second planetary gearset (19) is connectable, via the shifting mechanism (22), to one of the first and the second output shafts (16, 17).

14. The transmission device according to claim 12, wherein one of a sun gear (20) of the second planetary gearset (19) and a carrier (28) of the second planetary gearset (19) is connectable, via the shifting mechanism (22), to the first output shaft (16).

15. The transmission device according to claim 1, wherein the shifting mechanism (22) is arranged between the first planetary gearset (19) and the first output shaft (16).

\* \* \* \* \*